United States Patent Office 3,679,486
Patented July 25, 1972

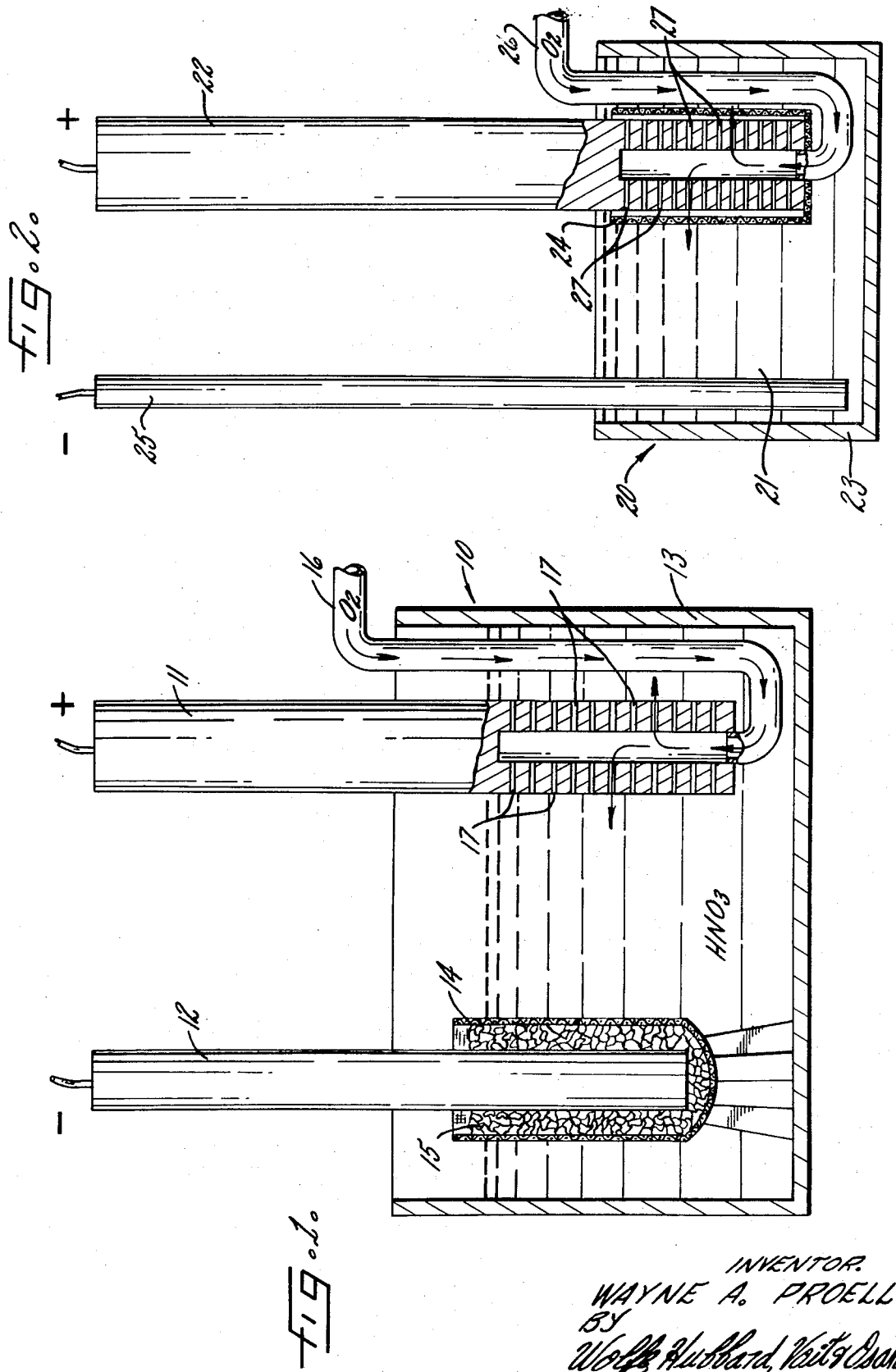

3,679,486
FUEL CELL AND METHOD OF OPERATING SAID CELL
Wayne A. Proell, Seymour, Ind., assignor to American Hydrocarbon Company, Salt Lake City, Utah
Filed Aug. 13, 1969, Ser. No. 849,655
Int. Cl. H01m 27/00
U.S. Cl. 136—86 E
13 Claims

ABSTRACT OF THE DISCLOSURE

A fuel cell with its anode comprising a carbon electrode and fossil fuel, its cathode a porous carbon electrode through which molecular oxygen is introduced into the fuel cell, and employing nitric acid as an electrolyte for the simultaneous production of electricity and humates. There is also disclosed an electrochemical process for the conversion of the chemical energy into electrical energy while simultaneously preparing a soil enriching agent from a fossil fuel.

---

This invention relates to fuel cells and, more particularly, to a fuel cell that simultaneously produces electricity and soil enriching agents from a fossil fuel.

Conventional electrical power producing devices such as gas or steam turbines generally produce electricity according to the following steps:

chemical energy→thermal energy+mechanical energy→electrical energy

Estimates of the overall efficiency of such processes range between 30% and 50%. A fuel cell, however, is a device in which the energy released during the oxidation of a fuel is made directly available in the form of an electric current. The fuel cell increases the overall efficiency of the conversion of chemical energy into electrical energy by avoiding the energy wasting steps of converting chemical energy into thermal and mechanical energy and then converting these into electrical energy.

At present most fuel cells involve the use of gaseous reactants at both the anode and cathode. As, for example, the hydrogen and oxygen fuel cell designed by Justi and Winsel and described in Kalte Verbrennung, Franz Steiner Verlog G.m.b.H., Wiesbaden, Germany, 1962, at pp. 59–327 thereof. These gaseous fuel cell reactants necessitate the use of porous carbon or of hollow carbon rods as electrodes. This type of porous or hollow electrode will be hereinafter called an "oxygen" or "air"-electrode. This electrode may be of any of the basic types of surface catalyzed porous or hollow carbon electrodes commonly used as "oxygen-electrodes" and described by L. G. Austin in Handbook of Fuel Cell Cell Technology, Prentice-Hall, Englewood Cliffs, N.J., at page 128 (1968), et seq. thereof. In a typical fuel cell, oxidation of the fuel by the electrolyte takes place at the anode and reduction of the oxidizing agent takes place at the cathode. As for example in an alkaline hydrogen-oxygen fuel cell where the overall reactions for the oxidation of hydrogen (the fuel) and reduction of oxygen (the oxidizing agent) are as follows:

at the anode: $2H_2 + 4OH^- \rightarrow 4H_2O + 4e^-$
at the cathode: $O_2 + 2H_2O + 4e^- \rightarrow 4OH^-$
for the cell: $2H_2 + O_2 \rightarrow 2H_2O$ When an external circuit is provided between the electrodes of the cell, electrons flow from the anode (where they are given up by the fuel) to the cathode (where they are taken up by the oxidizing agent) and thereby establish an electric current in the external circuit. The electric current thus established can be used to run motors, light electric bulbs, etc.

However, such fuel cells have limited application because of the relative impracticality of hydrogen gas as fuel. It is awkward to store either cryogenically or as a compressed gas. In addition, hydrogen gas is expensive. Other fuels have been employed, i.e., hydrazine (P. Anthony, "Hydrazine Fuel Cell Systems," Am. Inst. Chemical Engrs. 49th Natl. Meet., New Orleans, March 1963), hydrocarbons (The Fuel Cell: A Footnote on Research, ESSO Research and Engineering Co. Special Publication, Linden, N.J., 1960), and alcohols (B. Tarmy, Proc. Ann. Power Sources Conf., 16, 29–30, 1960). Fossilized carbon materials, such as coal, have also been employed as fuels in fuel cell systems. However, these systems employed solid conductors impregnated with an electrolyte (e.g., U.S. Pat. No. 2,830,109 to Justi et al.). Such systems, however, proved impractical from an economic point of view. The electrolyte-impregnated conductor was expensive and the fossilized carbon fuel was discarded after it was oxidized in the fuel cell.

It is, therefore, an object of this invention to convert the chemical energy of a fossilized carbon fuel into electrical energy without the abovementioned disadvantages.

It is another object of this invention to provide a fuel cell employing a fossilized carbon fuel, to produce electricity.

A further object of this invention is to produce a commercially useful product from the fossilized carbon fuel of a fuel cell while simultaneously producing electricity in the fuel cell.

Other objects and advantages will become apparent as the following description proceeds, taken in conjunction with the accompanying drawings, in which:

FIG. 1 is a vertical section of a simple fuel cell according to the invention employing an anode with a porous cup and an oxygen-electrode, and FIG. 2 is a vertical section of another embodiment of the fuel cell, employing an anode without a porous cup.

While the present invention is susceptible of various modifications and alternative forms, specific embodiments thereof have been shown by way of examples and in the drawings and will herein be described in detail. It should be understood, however, that it is not intended to limit the invention to the particular forms disclosed, but, on the contrary, the intention is to cover all modifications, equivalents and alternatives falling within the spirit and scope of the invention.

In accordance with this invention the conversion of the chemical energy of a fossilized carbon fuel, such as bituminous and sub-bituminous coal or coal-like materials, into electrical energy is effected in a fuel cell wherein an electrolyte, nitric acid, is present between an anode comprising an electrode at least partially surrounded by a normally solid oxidizable fossilized carbon fuel and oxygen or air-electrode, through which an oxidant gas may be introduced into the fuel cell, which is the cathode. The anode, cathode, and electrolyte are maintained at a temperature below the boiling point of the electrolyte, and a gaseous oxidant containing molecular oxygen is introduced into the fuel cell through the cathode. A potential difference and an electric current flow is thereby effected between the anode comprising the fossilized carbon fuel and the cathode. This electric current flow can be employed to do work, e.g., run electric motors, light electric bulbs, etc. During the operation of the fuel cell, the fossilized carbon fuel is oxidized to alkali-soluble products known as humates. These humates find wide application in agriculture as highly effective soil adjuvants and in other industries.

One embodiment of the fuel cell of the present invention is shown generally in FIG. 1 at 10. It consists of a battery jar 13, with a conventional oxygen-electrode 11 (a hollow carbon rod), which has been surface catalyzed by platinizing, and a solid carbon electrode 12, which has been inserted into a porous container 14. The fossilized carbon fuel 15 is charged into the porous cup 14. The platinized oxygen-electrode 11 and the solid carbon electrode 12 serve respectively as the cathode and the anode of the fuel cell. These two electrodes are then partially immersed in dilute nitric acid. While the nitric acid concentration is not though to be too critical, it should be below that strength that would oxidize or decompose the carbon fuel charged before the fuel cell is activated. Concentrations of nitric acid of between about 10% and about 25% have been used, and have been found to give satisfactory fuel cell current output and yields of humates.

To activate the fuel cell 10, a gaseous oxidant comprising molecular oxygen, e.g., air or pure oxygen, is passed into the hollow oxygen-electrode 11 through tube 16, and is allowed to bubble out through openings 17 into the electrolyte. The molecular oxygen oxidizes nitrogen oxide, formed by the decomposition of the nitric acid in solution, to nitrogen dioxide. At the anode, the nitric acid reacts with the fossilized carbon fuel 15, charged in the porous cup 14, to produce an oxidized fossil carbon fuel product (humates), nitrogen oxide, and electrons which flow through an external conductor 18 to complete the circuit. The fossilized carbon fuel 15 is usually charged into the porous cup 14 as a wet paste of the fossilized carbon fuel and electrolyte. Alternatively, a suspension of coal in the form of a slurry may be used.

In another embodiment of the invention, as shown in FIG. 2 generally at 20, a paste 21 made of fossilized carbon fuel and nitric acid is charged in tank 23 to substantially fill the same. An oxygen-electrode 22 is covered with a porous paper 24 to prevent it from coming into direct contact with the carbon fuel paste 21, and a solid carbon electrode 25 is then partially immersed in the fossilized carbon fuel-electrolyte paste 21. Those skilled in the art will readily recognize that in place of the porous paper 24, a diaphragm, made of porous cellulose or porous ceramic, could also be used to prevent the anode from coming into direct contact with the carbon fuel paste 21. The cell is then activated by passing a gaseous oxidant comprising molecular oxygen, e.g., air or pure oxygen, through tube 26 into the platinized oxygen-electrode 22, and allowing this gas to bubble out into the paste 21 through openings 27 and porous paper 24. This embodiment of the fuel cell of the invention is comparable to that previously described in current output and humate yield. When utilizing this embodiment of the invention multiple anodes may be employed in order to keep more of the coal-electrolyte paste or slurry near the anode of the cell.

While the fuel cell may be operated below, at, or above room temperature, it should not be operated at or above the boiling point of the electrolyte. It is preferred to operate the fuel cell at a temperature between about 20° F. and about 200° F. It has been found that when the temperature of an operating fuel cell is raised above about room temperature the fuel cell current output and humate yields begin to fall off as is indicated in Example 3. When operating the cell at temperatures below the freezing point of the electrolyte, it has been found that some precipitation of ice in the electrolyte does occur. Hence, if the cell is to be operated at sub-freezing temperatures, it would be desirable to use higher concentrations of the nitric acid electrolyte.

This fossilized carbon fuel cell can be operated to produce electric current on either a continuous or intermittent basis. To effect continuous operation, the anode may be constructed so as to allow continuous feed of the oxidizable carbon fuel to the porous cap and continuous removal of the humic acids produced. To deactivate the cell, the flow of molecular oxygen to the cathode is stopped.

When the fuel cell of the present invention has been described in terms of a single cell, those skilled in the art will appreciate that several such cells could be joined together in a single container to form a battery to thereby increase both the voltage and current output.

This novel fuel cell and process for the simultaneous production of electricity and humates can further be illustrated by means of the following examples which are not intended as limitations on the scope of the invention. In each of the following examples the amount of alkali-solubles is intended to refer directly to the amount of humates produced. This alkali solubility is determined by drying a portion of the material to be tested and then extracting a 0.5 gram sample thereof for two hours with 100 ml. of a 1 N NaOH solution at 165° F. After this time, the insolubles are filtered off, washed, dried and weighed. The difference in weight between the original dried sample and the dried residue gives the weight of the alkali-soluble material. It has been found that unoxidized coal gives about 8% alkali-soluble material. Therefore, all alkali-solubilities reported in the following samples have been corrected to reflect this 8% initial alkali solubility.

EXAMPLE 1

A fuel cell as shown in FIG. 1 was constructed. Into the porous cup of the anode was charged a paste made up of 50 grams of ball mill ground Coalville coal, which had a mesh size of about 90% below 400 mesh, and a 10% solution of $HNO_3$. A typical Coalville coal is of sub-bituminous rank and analyzed, on an ash-free basis, 73.9% carbon, 5.3% hydrogen, 1.7% nitrogen and 18.8% oxygen when received. It has been found that this coal when pulverized and treated with a mineral acid at room temperature, e.g., phosphoric acid, will yied about 8% alkali-soluble without even subjecting the same to the herein described oxidation process. It is believed that this is a result of releasing the acids from naturally occurring humates in the coal. The oxygen-electrode was platinized by dipping the lower four inches of it in a platinizing solution and then baking it in an oven at about 300° C. for about thirty minutes. The electrolyte for the cell was a 10% solution of $HNO_3$. The cell was activated by passing air into and through the platinized oxygen-electrode. The temperature of the cell during its operation remained constant at 77° F. The cell was subjected to a load resistance of 100Ω by means of a potentionmeter placed across the electrodes. After 45 minutes of operation, the cell reached a current output of 0.8 milliamp and a voltage of 0.13 volt which is maintained during approximately four hours of operation. After this time, it was found that the coal had been oxidized to a point where it was 46% alkali-soluble. The results of tests of this cell, recorded at various time intervals, are set forth below in Table 1.

TABLE 1

| Operating time | Open cell voltage | Current in ma. | Resistance across cell in Ω |
|---|---|---|---|
| Minutes: | | | |
| 3 | 0.36 | 3.0 | 100 |
| 9 | 0.20 | 2.0 | 100 |
| 15 | 0.18 | 1.8 | 100 |
| 30 | 0.15 | 1.0 | 100 |
| 45 | 0.13 | 0.8 | 100 |
| Hours: | | | |
| 4 | 0.13 | 0.8 | 100 |
| 5 | 0.12 | 0.7 | 100 |

EXAMPLE 2

A fuel cell as shown in FIG. 2 was constructed. Into the fuel cell was charged a paste made up of 150 grams of ball mill ground Coalville coal, which had a mesh size of about 90% below 400 mesh, and a solution of 10% $HNO_3$. A typical Coalville coal is of sub-bituminous rank and analyzed, on an ash-free basis, 73.9% carbon, 5.3% hydrogen, 1.7% nitrogen and 18.8% oxygen when received. It has been found that this coal when pulverized and treated with a mineral acid at room temperature, e.g., phosphoric acid, will yield from 10 to 15% alkali-solubles without even subjecting the same to the herein described oxidation process. It is believed that this is a result of releasing the acids from naturally occurring humates in the coal. Before partially immersing the electrodes in this paste, the oxygen-electrode, after activation by platinizing as in Example 1, was covered with porous fast filter paper. This porous paper served to keep the platinized oxygen-electrode from coming into direct contact with the paste charged. The carbon electrode and the porous-paper wrapped activated oxygen-electrode were then partially immersed in the coal-10% $HNO_3$ paste. The cell was activated by passing air through the platinized oxygen-electrode. The cell was subjected to a load resistance of 100Ω by means of a potentiometer placed across the electrodes. After 49 hours of continuous operation, the current output was 1.0 milliamp and delivered 0.10 volt. After this time, it was found that the oxidized coal product was about 6 to 12% alkali-soluble. The results of tests of this cell, recorded at various time intervals, are set forth below in Table 2.

TABLE 2

| Operating time | Open cell voltage | Current in ma. | Resistance across cell in Ω |
|---|---|---|---|
| Minutes: | | | |
| 1 | 0.35 | 3.2 | 100 |
| 15 | 0.31 | 3.0 | 100 |
| 30 | 0.27 | 2.5 | 100 |
| Hours: | | | |
| 1 | 0.23 | 2.0 | 100 |
| 2 | 0.15 | 1.5 | 100 |
| 3 | 0.14 | 1.4 | 100 |
| 30 | 0.14 | 1.4 | 100 |
| 40 | 0.12 | 1.2 | 100 |
| 49 | 0.10 | 1.0 | 100 |
| 51 | 0.08 | 0.8 | 100 |

EXAMPLE 3

A fuel cell was constructed, charged and activated as in Example 2. However, after activation, the operating temperature of the cell was raised by heating, and with stirring, until the cell temperature reached 150° F., after which time heating was discontinued. The results of tests on the output of this cell, conducted at various time intervals during the heating and subsequent cooling periods, are set forth below in Table 3. The oxidized coal product after 18 hours was found to be about 9% alkali-soluble.

TABLE 3

| Operating time | Temperature in ° F. | Open cell voltage | Current in ma. |
|---|---|---|---|
| 0.0 minutes | 18.8 | 0.4 | 5.0 |
| 30 minutes | 77.0 | 0.43 | 6.0 |
| 1 hour 20 minutes | 84.2 | 0.38 | 5.0 |
| 1 hour 50 minutes | 85.0 | 0.36 | 5.0 |
| 2 hours 8 minutes | 149.0 | 0.33 | 5.0 |
| 2 hours 27 minutes | 127.4 | 0.23 | 3.0 |
| 18 hours | 68.0 | 0.11 | 1.0 |

EXAMPLE 4

A fuel cell as shown in FIG. 1 was constructed. Into the porous cup of the cathode was charged 50 grams of ball mill ground Coalville coal, which had a mesh size of about 90% below 400 mesh. The electrolyte for this cell was 1500 ml. of 25% $HNO_3$. As in Example 1, the oxygen-electrode was platinized. Activation of the fuel cell was accomplished by passing air through the platinized oxygen-electrode. The fuel cell was subjected to a load resistance of 50Ω by means of a potentiometer placed across the electrodes. The results of tests of this cell, recorded at various time intervals, are set forth below in Table 4. The oxidized coal product from the cell was found to be about 13% alkali-soluble.

TABLE 4

| Operating time | Open cell voltage | Current in ma. | Resistance across cell in Ω |
|---|---|---|---|
| Minutes: | | | |
| 5 | 0.08 | 0.8 | 50 |
| 30 | 0.02 | 0.2 | 50 |
| Hours: | | | |
| 1 | 0.03 | 0.3 | 50 |
| 2 | 0.04 | 0.4 | 50 |
| 3 | 0.06 | 0.6 | 60 |
| 8 | 0.06 | 0.6 | 50 |
| 17.5 | 0.09 | 1.0 | 50 |
| 27 | 0.10 | 1.3 | 50 |
| 65 | 0.08 | 1.0 | 50 |

EXAMPLE 5

A fuel cell was constructed, charged and activated as in Example 1. However, after activation, the operating temperature of the cell was lowered, by means of a Dry Ice bath, until the temperature of the cell was 23° F. It was found that at this low temperature, some ice was formed in the electrolyte. The results of tests on the output of this cell, conducted at various time intervals during the cooling period are set forth below in Table 5.

TABLE 5

| Operating time | Temperature in ° F. | Open cell voltage |
|---|---|---|
| 10 minutes | 75.2 | 0.27 |
| 43 minutes | 57.2 | 0.23 |
| 55 minutes | 50.0 | 0.23 |
| 1 hour 16 minutes | 42.8 | 0.23 |
| 1 hour 32 minutes | 35.6 | 0.22 |
| 1 hour 40 minutes | 32 | 0.22 |
| 2 hours 10 minutes | 28.6 | 0.20 |
| 2 hours 47 minutes | 23.0 | 0.20 |
| 4 hours | 22.1 | 0.19 |

I claim as my invention:

1. A fuel cell comprising in combinataion a container, an anode comprising an electrode at least partially surrounded by a particulate, normally solid, oxidizable fossilized carbon fuel containing an alkali-soluble producing substance, a cathode comprising an oxygen-electrode, a nitric acid electrolyte, a substantial part of said anode and cathode being immersed in said electrolyte, and providing an ion path therebetween, and means for supplying a gaseous oxidant comprising molecular oxygen to said cathode.

2. The fuel cell of claim 1 wherein the normally solid oxidizable fossilized carbon fuel is coal.

3. The fuel cell of claim 1 wherein the normally solid oxidizable fossilized carbon fuel is coal and the same is disposed in a porous holder.

4. The fuel cell of claim 1 wherein the concentration of the nitric acid as electrolyte is between about 10% and about 25%.

5. The fuel cell of claim 1 wherein the gaseous oxidant is air.

6. The fuel cell of claim 1 wherein the normally solid oxidizable fossilized carbon fuel and a substantial portion of the nitric acid electrolyte are combined in a paste-like solid.

7. The process for simultaneously producing electricity and useful oxidation products from the normally solid fossilized carbon fuel of claim 1 which comprises introducing a gaseous oxidant comprising molecular oxygen to the gas electrode of the fuel cell of claim 1.

8. The process for continuously producing electricity and useful oxidation products of fossilized carbon fuel in the fuel cell of claim 1 which comprises the steps of (1) introducing into the oxygen-electrode a gaseous oxidant comprising molecular oxygen, (2) maintaining a substantial depth of nitric acid electrolyte, (3) maintaining a substantial quantity of particulate, normally solid oxidizable fossilized carbon fuel at said anode, and (4) removing oxidation products of said fossilized carbon fuel while the fuel containing an alkali soluble producing substance cell is in operation.

9. The process of claim 8 wherein the normally solid oxidizable fossilized carbon fuel is coal.

10. The process of claim 8 wherein the concentration of the nitric acid electrolyte is from about 10% to about 25%.

11. The process of claim 8 wherein the temperature of operation of the fuel cell is maintained in the range of from about 20° F. to about 200° F.

12. The process of claim 8 wherein the gaseous oxidant containing molecular oxygen is air.

13. The process of claim 8 wherein the oxidation products comprise humates.

References Cited

UNITED STATES PATENTS

| | | | |
|---|---|---|---|
| 3,223,556 | 12/1965 | Cohn et al. | 136—86 |
| 3,468,714 | 9/1969 | Gumeio | 136—86 |

FOREIGN PATENTS

| | | | |
|---|---|---|---|
| 8,906 | 1896 | Great Britain | 136—84 |

WINSTON A. DOUGLAS, Primary Examiner

H. FEELEY, Assistant Examiner